April 16, 1957  C. B. BECHTEL ET AL  2,789,268
METHOD AND APPARATUS FOR IDENTIFYING ELECTRIC CONDUCTORS
Filed Sept. 27, 1955
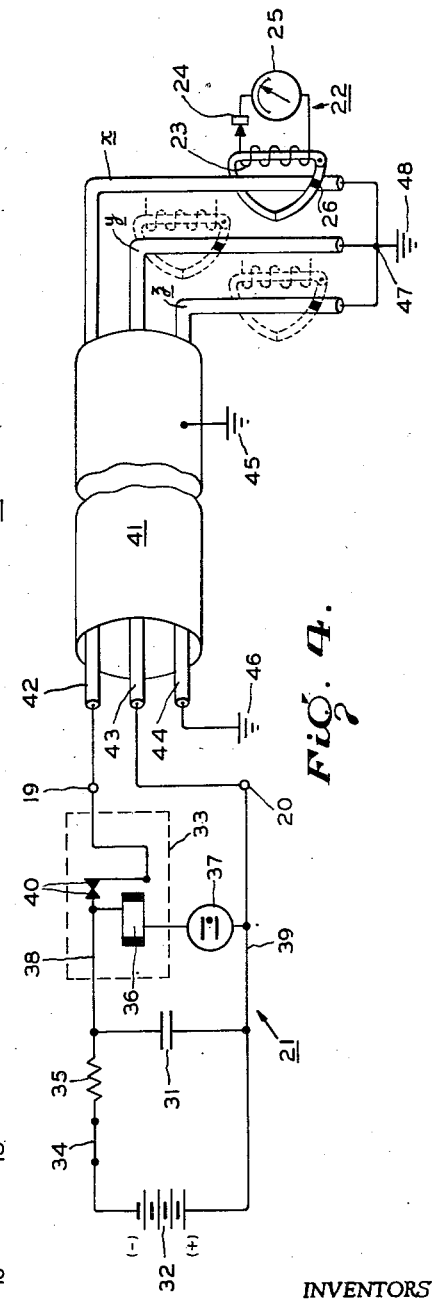
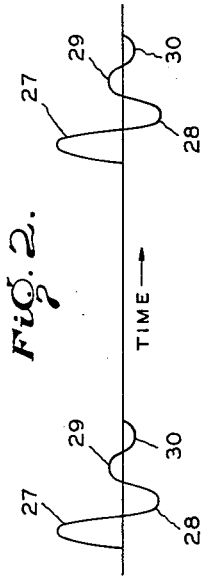
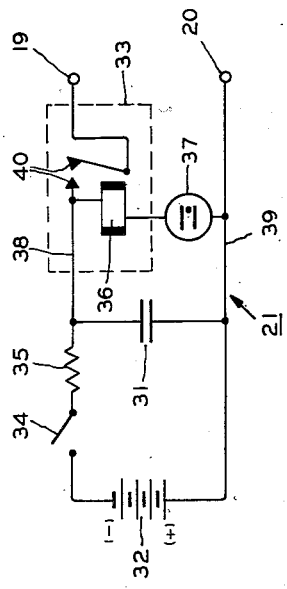
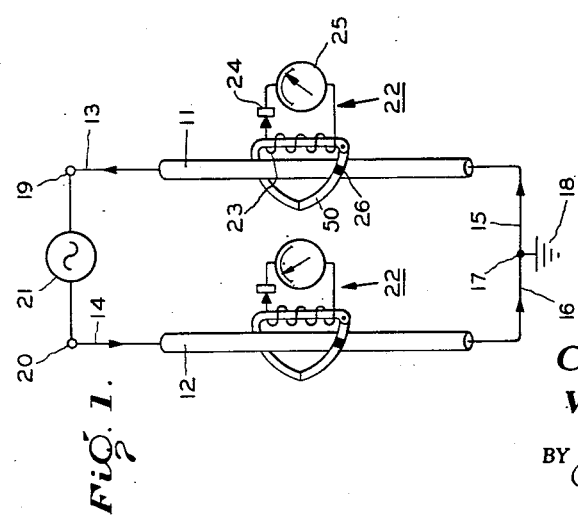
INVENTORS
*Charles B. Bechtel.*
*William P. Taylor.*
BY *Cameron, Kerkam & Sutton*
ATTORNEYS ൲United States Patent Office 2,789,268
Patented Apr. 16, 1957

2,789,268

METHOD AND APPARATUS FOR IDENTIFYING ELECTRIC CONDUCTORS

Charles B. Bechtel and William P. Taylor, Baltimore, Md., assignors to Baltimore Gas and Electric Company, Baltimore, Md., a corporation of Maryland Application September 27, 1955, Serial No. 537,018

12 Claims. (Cl. 324—66)

This invention relates to a method and apparatus for identifying electric conductors at points remote from their origins or from other points at which their identities are known, and is particularly concerned with ways and means of accurately determining the identity of each conductor of a polyphase power transmission or distribution system at any point remote from the source of power.

In the installation of electric conductors, it is frequently necessary to match the remote and near ends of any given conductor, especially in a polyphase system wherein the system phase designations must be maintained in newly installed conductors. For example, when a new cable is connected to an existing alternating current system, the conductor connected to phase A of the system must be identifiable as phase A at its remote end, the conductor connected to phase B of the system must be similarly identifiable as phase B, and so on. The invention is also particularly well adapted to the identification of the phases of a feeder line to which transformers are connected at tap points and where, for safety reasons, grounding of the transformer terminals is desired, and/or where the neutrals of the transformers are grounded.

The principal object of the present invention is to provide a novel method and means for quickly, accurately and safely identifying electric conductors under such conditions as those above indicated.

The method and apparatus provided by the invention are characterized by the use of means which indicate the relative directions of current flow in pairs of conductors when their near ends are connected to a generator or transmitter of oscillatory pulses and their remote ends are connected together, and preferably grounded, at a common junction point. The fact that it is possible to ground the conductors during the identification test is an advantageous feature of the invention because the operator of the apparatus is thereby protected from the effects of possible accidental energization of the input end of the conductor system while the test is in progress.

Although only one specific form of conductor identifying apparatus is described and illustrated in the accompanying drawing, it is to be expressly understood that this drawing is exemplary only and is not to be construed as representing the full scope of the invention, for which latter purpose reference should be had to the appended claims.

Referring now to the drawing, wherein like reference characters indicate like elements throughout the several views:

Fig. 1 is a diagrammatic illustration of the principle of the method and the character of the apparatus of the present invention by which two electric conductors may be identified at any point remote from their "near ends," which latter term will be employed hereinafter to indicate either the ends of the conductors nearer the source of power, or, more generally, the ends at which their identities are known;

Fig. 2 is a wave form diagram (not to scale) illustrating the nature of the oscillatory pulses which are supplied to the conductors during the identification test;

Fig. 3 is a diagram of the electrical elements of one form of energizing device or transmitter for providing test pulses of the form illustrated in Fig. 2; and Fig. 4 is a schematic representation of a three-phase, three-conductor cable in combination with testing apparatus for identifying the respective conductors of the cable in accordance with the present invention.

As indicated in Fig. 1, the respective conductors of a pair of electric conductors 11 and 12 may be identified at any point remote from their near ends 13, 14 by (a) electrically connecting the remote ends 15, 16 together at a junction point 17, and preferably grounding the junction as indicated at 18, (b) connecting the near ends to the terminals 19, 20 of a suitable energizing device or transmitter 21 which is adapted to supply to the conductors periodic current pulses of a damped, oscillatory wave form having the first half-wave of each of the pulses of like polarity as illustrated in Fig. 2, and (c) successively applying to the conductors at the point where their identities are to be established a measuring device or receiver 22 which is so constructed and arranged as to respond to the even-numbered half-waves 28, 30 of Fig. 2 when applied to one of conductors 11, 12 and to the odd-numbered half-waves 27, 29 when applied to the other of conductors 11, 12, provided receiver 22 is applied to the conductors in a predetermined manner as illustrated in Fig. 1 and as explained below.

In the embodiment illustrated, the receiver 22 comprises a pick-up coil 23, a half-wave rectifier 24 and a current indicator 25, such as a microammeter, connected in series with one another. Pick-up coil 23 is preferably provided with a magnetic core 50 of the snap-around type so as to facilitate successive application to conductors 11 and 12. Core 50 is provided with a suitable index 26, to permit identification of one face thereof. The purpose of the index 26 is to insure that receiver 22 may be applied to each conductor in the same predetermined position or physical relationship such as when the index faces toward either junction point 17 or transmitter 21, with the result that, during certain segments or half-waves of the current pulses (as 27, 29 in Fig. 2) flowing in the conductors, current will flow in coil 23 in the one direction permitted by half-wave rectifier 24 when the receiver is applied to one of the conductors (as conductor 11) and will be prevented from flowing, by half-wave rectifier 24, when similarly applied to the other conductor (as conductor 12). On the other segments or half-waves of the current pulses (as 28, 30 in Fig. 2), the current conditions will be reversed, i. e., current will not flow in coil 23 when receiver 22 is associated with conductor 11 and will flow in coil 23 when receiver 22 is associated with conductor 12. In Fig. 1, receiver 22 is applied to conductors 11, 12 so that index 26 faces toward transmitter 21 when the plane of core 50 is perpendicular to the axis of the conductors.

Although the receiver 22 may take various forms, it has been found that a commercially available snap-around ammeter known as the Amprobe, manufactured by the Pyramid Instrument Corporation, may be readily adapted for use in accordance with the present invention. This may be accomplished by connecting in series with the magnetic core, coil and current indicator of the Amprobe device a half-wave rectifier 24, and by adding an appropriate core orienting index 26.

In order that the pick-up coil and half-wave rectifier arrangement of receiver 22 may identify the relative directions of the current flow in conductors 11 and 12, it is necessary that the wave form of the current pulses be oscillatory in nature, of suitable magnitude and frequency, have the same polarity for the initial half-wave, and have a suitably high decrement. Fig. 2 illustrates one wave form which is suitable for the purposes of the present invention, wherein each of half-waves 27, 28, 29, 30 is of greater amplitude than, and of opposite polarity to, each succeeding half-wave, the frequency of oscillation is high in comparison with power frequencies, and the first half-waves 27 of the current pulses are of the same polarity.

When current pulses of this form are supplied to conductors 11 and 12 by transmitter 21 in the set-up illustrated in Fig. 1, the current flow through the two conductors at any instant is in opposite directions; i. e., if the current is passing through conductor 11 toward transmitter 21 and away from junction point 17, it is simultaneously flowing through conductor 12 away from transmitter 21 and toward junction point 17, as indicated by the arrows in the drawing. If in Fig. 1 transmitter 21 is providing current pulses of suitable type such as are illustrated in Fig. 2, application of receiver 22 to conductor 11 with index 26 toward transmitter 21 will, due to the inclusion in the receiver circuit of half-wave rectifier 24, cause meter 25 to respond to, say, the odd-numbered alternate half-waves 27, 29, whereas application of receiver 22 to conductor 12 in the same relative position, i. e., with index 26 toward transmitter 21, will cause the meter to respond to the even-numbered alternate half-waves 28, 30. Because of the high decrement in the current pulses shown in Fig. 2, the average amplitude of the odd-numbered half-waves is greater than that of the even-numbered half-waves. Consequently, the reading of meter 25 is greater when the receiver is applied to conductor 11 and responds to the odd-numbered half-waves than when it is applied to conductor 12 and is responsive to the even-numbered half-waves.

Since the same relative indications will be given by receiver 22 at all points along the lengths of conductors 11 and 12, so long as the receiver is applied to the individual conductors in the same predetermined position, it is evident that the conductors may be properly identified at any point remote from their near ends by simply comparing the amplitude measurements indicated by meter 25 at a point where the identity of the conductors is unknown with the indications obtained when the receiver is applied to the near ends 13, 14 of the conductors, or to any other point at which their identities have already been established. In other words, under the conditions assumed above where the current pulses carried by conductor 11 produce an indication by meter 25 which is proportional to the amplitudes of the odd-numbered half-waves 27, 29, while the same current pulses, when receiver 22 is applied to conductor 12, give an indication proportional to the amplitudes of the even-numbered half-waves 28, 30, whichever conductor produces the greater indication on the meter at any point is thereby identified as conductor 11 while the conductor producing the smaller indication is identified as conductor 12.

Various arrangements may be employed in the energizing device or transmitter 21 for producing the type of current pulses required for the present invention, one of which is diagrammatically represented in Fig. 3. As there shown, the transmitter 21 comprises a capacitor 31, a circuit for charging the capacitor from a source of direct current, such as a battery 32, and a circuit for discharging said capacitor including the output terminals 19, 20 which are adapted for connection to the near ends of the conductors to be identified, and a relay 33 which is responsive to the voltage across the capacitor for periodically connecting the latter across said terminals.

The circuit for charging capacitor 31 includes a manually operable charging switch 34 which remains closed throughout the testing operation, and a current limiting resistor 35 which controls the rate at which the capacitor is charged. The relay 33 of the discharging circuit includes an electromagnet winding 36 which is connected in series with a current controlling device 37 across the conductors 38, 39 connecting capacitor 31 to terminals 19, 20, and a pair of normally open contacts 40 which are controlled by winding 36 and interposed in conductor 38 between said winding and terminal 19. Current controlling device 37 may take the form of a glow discharge tube, such as a commercial neon glow lamp. The polarity of terminals 19, 20 depends on the polarity of battery 32. In Fig. 3 the positive (+) side of the battery is shown connected to terminal 20 and hence the first half-wave 27 of each current pulse flows outward from terminal 20 and inward at terminal 19 when these terminals are joined electrically.

The relationship between device 37 and relay winding 36 is such that, when the voltage across the terminals of said device reaches a predetermined threshold value as capacitor 31 is charged, the device 37 permits sufficient current to flow through winding 36 to energize the winding and close relay contacts 40, whereupon capacitor 31 discharges through the circuit connected to output terminals 19, 20, producing an oscillatory current of the desired characteristics above mentioned. As indicated in Fig. 2, each current pulse supplied from terminals 19, 20 starts with a first half-wave of the same polarity; i. e., the polarity of half-wave 27 is the same in each current pulse.

Since the presence of resistor 35 in the charging circuit prevents immediate recharge of capacitor 31, the voltage of the capacitor drops during discharge until the voltage applied to device 37 falls somewhat below the threshold or breakdown value, whereupon device 37 interrupts the flow of current through winding 36 and relay contacts 40 open. Capacitor 31 is then recharged until it attains a voltage sufficient to again render device 37 conductive and to energize the relay so as to effect reclosure of contacts 40 and again discharge the capacitor through the circuit connected to terminals 19, 20. It has been found that approximately one closure per second of contacts 40, which produces approximately one current pulse per second, is a suitable pulse rate, although relatively wide departures from this value may be permitted.

One form of transmitter which has been used successfully in practicing the invention includes a charging source 32 comprising 135 volts of radio "B" batteries with their polarity arranged as indicated in Fig. 2, a resistor 35 having a resistance of 5000 ohms, a capacitor 31 having a capacitance of 200 microfarads, a standard relay 33 having a 2000 ohm winding 36 and metal-to-carbon contacts 40, and a current controlling device 37 consisting of a commercial neon glow lamp having a threshold or breakdown voltage in the range from 65 to 85 volts. A transmitter of these characteristics will provide the desired pulse rate of approximately one pulse per second under test conditions usually encountered.

Application of the invention to a typical case involving identification of the conductors of a three-phase, three-conductor cable will now be described with reference to Fig. 4 wherein the transmitter 21 of Fig. 3 and receiver 22 of Fig. 1 are shown in use with a cable 41 having conductors 42, 43 and 44 enclosed in a sheath which, if of conducting material, is grounded as indicated at 45. The problem is to determine which of conductors 42, 43 and 44 at the near end of the cable, where the identities of the conductors are known, corresponds to each of conductors $x$, $y$ and $z$ at the remote end, or at any point remote from the near end, where the conductor identities are unknown and where the individual conductors are available for testing.

In order to make the identification test, the terminals 19, 20 of transmitter 21 are connected to the near ends of any two of conductors 42, 43, 44, such as conductors 42 and 43; and the near end of the other conductor, conductor 44 in the example illustrated in Fig. 4, is grounded as indicated at 46. At their remote ends, conductors $x$, $y$ and $z$ are connected together at a common junction point 47 which is preferably, but not necessarily, grounded as indicated at 48.

Unless transmitter 21 and receiver 22 have been calibrated previously, it is necessary to establish the relationship between the order of connection of the conductors to terminals 19 and 20 of the transmitter and the indications of meter 25 of receiver 22 when the latter is applied to the respective conductors. For this calibration test, pick-up coil 23 of the receiver is applied successively to the near ends of conductors 42 and 43 in the same predetermined position or physical relationship, as with the index 26 facing transmitter 21, and a determination is made of the relative readings of meter 25 when the receiver is applied to the respective conductors. For example, it may be found that the conductor producing the larger deflection of meter 25 is that which is connected to terminal 19 of the transmitter, or vice versa. The relationship established during the calibration test will remain valid when similar observations are made on conductors of unknown identity as long as the pick-up coil is applied to the conductors in the same manner, i. e., with index 26 facing transmitter 21, and as long as the polarity of the voltage applied to capacitor 31 by the charging circuit (battery 32, in this case) and the connections to coil 23, half-wave rectifier 24 and microammeter 25 of the receiver remain unchanged. The data established by the calibration test thus permits the accurate identification of conductors at any point remote from the ends thereof at which their identities are known.

In the case illustrated in Fig. 4, identification of conductors $x$, $y$ and $z$ is effected by applying receiver 22 successively to said conductors in the proper predetermined position wherein index 26 faces transmitter 21, and observing the indications of meter 25. Under the conditions shown, as long as charging switch 34 is closed, transmitter 21 will periodically send current pulses of the damped, oscillatory form indicated in Fig. 2 through conductors 42 and 43, but no current will flow in conductor 44. Consequently, receiver 22 will provide indications on meter 25 of the relative amplitudes of the odd-numbered half-waves of current flowing in one, and the even-numbered half-waves of current flowing in the other, of two of the three conductors $x$, $y$ and $z$, but will produce no indication when the pick-up coil is applied to the third conductor, i. e., that identified as conductor 44 at the near end of the cable adjacent the transmitter. If deflections of meter 25 are observed when the pick-up coil is applied to conductors $x$ and $y$, for example, and if the deflection is larger in the case of conductor $x$ than in the case of conductor $y$, the relationship established by the calibration test results in the identification of conductors $x$ and $y$ as being connected to transmitter terminals 19 and 20, respectively, and as being the remote ends of conductors 42 and 43, respectively. The zero reading of meter 25 when the coil is applied to conductor $z$ identifies the latter as the grounded conductor 44. If desired, the test may be repeated with conductor 44 connected to one of the terminals of transmitter 21 so that conductor $z$ may be identified directly.

With the information provided by the identification test, the near ends of conductors 42, 43 and 44 may be connected to a three-phase alternating current system and the phase designations therein established can then be applied to conductors $x$, $y$ and $z$ at the remote end of the cable, or at any point remote from the near end thereof.

An alternative procedure for identifying the conductors involves a slightly different method of using the receiver 22, but employs the same calibration data as that described above. Referring to the three-phase cable illustration of Fig. 4, if receiver 22 is applied to conductor $x$ with the index 26 facing transmitter 21, and is then reversed so that the index faces junction point 47, two different readings of meter 25 will be obtained, the larger reading occurring (under the conditions assumed in the set-up of Fig. 4) when the index faces the transmitter. The pick-up coil may then be applied to conductor $y$ with the index pointing toward and away from transmitter 21, and again two different deflections will be obtained, the larger one of which will occur when the index points away from the transmitter. Based on these observations, the conductors may be identified by application of the following rules:

I. When the larger meter reading for a given conductor is obtained with the receiver index facing the transmitter, that conductor is connected to terminal 19 of the transmitter.

II. When the larger reading for a given conductor is obtained when the index faces away from the transmitter, i. e. toward the junction point, that conductor is connected to terminal 20 of the transmitter.

There is thus provided by the present invention a novel method and apparatus for quickly, accurately and safely identifying electric conductors at points remote from the ends thereof at which their identities are known. While only one particular form of apparatus embodying the invention has been described and diagrammatically illustrated in the accompanying drawing, it will be obvious that the invention is not limited to the specific means shown but is capable of a variety of mechanical and electrical embodiments.

For example, any suitable pulse generating circuit capable of producing pulses of the general character illustrated in Fig. 2 may be substituted for the transmitter arrangement of Fig. 3; and even in the latter arrangement, it is obvious that the charging battery 32 may be replaced by any other suitable source of direct current, such as a rectifier, and that other types of current controlling devices, such as an electron tube with associated triggering circuit, may be substituted for the glow discharge lamp 37. It will also be evident that other half-wave responsive current measuring devices may be used instead of the specific arrangement of snap-around magnetic core and pick-up coil, half-wave rectifier and microammeter shown as comprising the receiver 22. As far as the method is concerned, it will be understood that it may be used for the identification of conductors which are separately installed as well as cable conductors, and that any number of parallel conductors may be identified according to the method by testing them in pairs in the manner described.

Various other changes, which will now become apparent to those skilled in the art, may be made in the procedural steps of the method, or in the form, electrical characteristics and arrangement of elements of the apparatus, without departing from the spirit of the invention. Reference is therefore to be had to the appended claims for a definition of the limits of the invention.

What is claimed is:

1. A method of identifying the respective conductors of a pair of electric conductors at points remote from the ends thereof at which their identities are known comprising the steps of electrically connecting together the ends of said conductors remote from the ends of known identity, supplying to the ends of known identity periodic current pulses of a damped, oscillatory wave form and of the same polarity for the first half-wave of each pulse, and comparing at a point remote from the ends of known identity the amplitudes of the odd-numbered alternate half-waves of the current pulses flowing in one of said conductors and the amplitudes of the even-numbered alternate half-waves of the current pulses flowing in the other conductor, whereby the identity of the respective conductors may be determined by the relationship between said amplitudes and the mode of connection of the ends of known identity to the current supply.

2. A method as claimed in claim 1 wherein the ends of said conductors remote from the ends of known identity are grounded.

3. A method of identifying the respective conductors of a pair of electric conductors at points remote from the ends thereof at which their identities are known comprising the steps of electrically connecting together the ends of said conductors remote from the ends of known identity, connecting the ends of known identity to a source of periodic current pulses of a damped, oscillatory wave form and of the same polarity for the first half-wave of each pulse, successively applying to said conductors at points remote from the ends of known identity the pick-up coil of a current measuring device which includes a half-wave rectifier and a current indicator, said pick-up coil being applied to each conductor in the same predetermined position relative to the ends of known identity, and comparing the amplitude of at least one of the half-waves of current of a given polarity measured by said indicator when said pick-up coil is applied to one of said conductors with the amplitude of at least one of the half-waves of current of the opposite polarity when said pick-up coil is applied to the other of said conductors, whereby the identity of the respective conductors may be determined by the relationship between the said current amplitudes and the mode of connection of the ends of known identity to the current source.

4. A method as claimed in claim 3 wherein the ends of said conductors remote from the ends of known identity are grounded.

5. A method of identifying the respective conductors of a pair of electric conductors at points remote from the ends thereof at which their identities are known comprising the steps of electrically connecting together the ends of said conductors remote from the ends of known identity, supplying to the ends of known identity periodic current pulses of a damped, oscillatory wave form and of the same polarity for the first half-wave of each pulse, determining, at a point where the identities of said conductors are known, which of said conductors carries current away from the connection therebetween and which conductor carries current toward said connection during a selected series of half-waves of the current pulses, and then identifying the respective conductors at a point where their identities are unknown by determining which of said conductors carries current away from said connection and which conductor carries current toward said connection during the same selected series of half-waves of the current pulses.

6. Apparatus for identifying the respective conductors of a pair of electric conductors at points remote from the ends thereof at which their identities are known comprising means for supplying to the ends of said conductors of known identity periodic current pulses of a damped, oscillatory wave form and of the same polarity for the first half-wave of each pulse so that, when the opposite ends of said conductors are electrically connected together, the current pulses flow in opposite directions in the respective conductors relative to their point of connection, and means for measuring the relative amplitudes of alternate half-waves of the current pulses flowing in said conductors.

7. Apparatus as claimed in claim 6 wherein said measuring means comprises a pick-up coil, a half-wave rectifier and a current indicator connected in series with one another, said pick-up coil being adapted for magnetic association with each of the conductors in the same predetermined position relative to their point of connection.

8. Apparatus for identifying the respective conductors of a pair of electric conductors at points remote from the ends thereof at which their identities are known comprising means for supplying to the ends of said conductors of known identity periodic current pulses of a damped, oscillatory wave form and of the same polarity for the first half-wave of each pulse so that, when the opposite ends of said conductors are electrically connected together, the current pulses flow in opposite directions in the respective conductors relative to their point of connection, and means for measuring the amplitudes of the odd-numbered alternate half-waves of the current pulses flowing in one of said conductors and the amplitudes of the even-numbered alternate half-waves of the current pulses flowing in the other conductor.

9. Apparatus for identifying the respective conductors of a pair of electric conductors at points remote from the ends thereof at which their identities are known comprising means for supplying to the ends of said conductors of known identity periodic current pulses of a damped, oscillatory wave form and of the same polarity for the first half-wave of each pulse so that, when the opposite ends of said conductors are electrically connected together, the current pulses flow in opposite directions in the respective conductors relative to their point of connection, and means for measuring the amplitudes of alternate half-waves of the current pulses flowing in said conductors, said means being responsive to the odd-numbered half-waves flowing in one of said conductors and to the even-numbered half-waves flowing in the other conductor.

10. Apparatus as claimed in claim 9 wherein said measuring means comprises a pick-up coil provided with a snap-around magnetic core, a half-wave rectifier and a microammeter connected in series with one another, and an index enabling application of said coil to each conductor in the same predetermined position relative to their point of connection.

11. Apparatus as claimed in claim 6 wherein said current supply means comprises a source of direct current, a capacitor, a circuit for charging said capacitor from said direct current source, and a circuit for discharging said capacitor including a pair of output terminals adapted for connection to the ends of said conductors of known identity and a relay responsive to the voltage across said capacitor for periodically connecting said capacitor across said terminals.

12. Apparatus as claimed in claim 6 wherein said current supply means comprises a source of direct current, a capacitor, a circuit for charging said capacitor from said direct current source, and a circuit for discharging said capacitor including a pair of output terminals adapted for connection to the ends of said conductors of known identity and a relay responsive to the voltage across said capacitor for periodically connecting said capacitor across said terminals, and wherein said measuring means comprises a pick-up coil, a half-wave rectifier and a current indicator connected in series with one another, said pick-up coil being adapted for application to and magnetic coupling with each of the conductors in the same predetermined position relative to their point of connection.

References Cited in the file of this patent

UNITED STATES PATENTS

| | | |
|---|---|---|
| 659,357 | Athearn | Oct. 9, 1900 |
| 1,830,541 | Harris | Nov. 3, 1931 |
| 1,908,297 | Anderson | May 9, 1933 |
| 2,375,591 | Schweitzer | May 8, 1945 |
| 2,447,911 | Mages et al. | Aug. 24, 1948 |